US006189877B1

(12) United States Patent
Boris et al.

(10) Patent No.: US 6,189,877 B1
(45) Date of Patent: Feb. 20, 2001

(54) DEVICE FOR POSITIONING, HOLDING OR GRIPPING

(75) Inventors: Jean-Mathieu Boris, Paris; Fabrice Roudier, Juziers, both of (FR)

(73) Assignee: Genus Technologies, Chatillon (FR)

( * ) Notice: Under 35 U.S.C. 154(b), the term of this patent shall be extended for 0 days.

(21) Appl. No.: 09/340,117

(22) Filed: Jun. 28, 1999

(30) Foreign Application Priority Data

Jun. 26, 1998 (FR) ..................................... 98-01820

(51) Int. Cl.[7] ..................................... B23Q 3/08
(52) U.S. Cl. ..................................... 269/32; 269/27; 269/228
(58) Field of Search ..................................... 269/32, 30, 228

(56) References Cited

U.S. PATENT DOCUMENTS 4,506,871 * 3/1985 Yonezawa ..................................... 269/32
4,673,173 * 6/1987 Shochi et al. ..................................... 269/32
5,034,621 * 7/1991 Groves et al. ..................................... 269/32
5,875,417 * 2/1999 Golden ..................................... 269/32
5,996,984 * 12/1999 Takahashi ..................................... 269/32

FOREIGN PATENT DOCUMENTS 34 03 961 8/1995 (DE) .
297 00 981 U 3/1997 (DE) .
0 695 603 2/1996 (EP) .
0 803 331 10/1997 (EP) .
0 849 047 6/1998 (EP) .

* cited by examiner

*Primary Examiner*—Timothy V. Eley
*Assistant Examiner*—Lee Wilson
(74) *Attorney, Agent, or Firm*—Young & Thompson

(57) ABSTRACT

A gripping device, particularly for vehicle body work, comprises a housing 1 containing a moveable equipment 26 displaceable in translation. One end 26*a* of the moveable equipment 26 is connected to an actuator 25 and the other end 27 of the moveable equipment 26 is connected to a gripping member 24. The housing 1 has two separate and spaced openings 8, 9 adapted each to receive a detector 18, 19 of the position of the moveable equipment 26 or of a rod 25*a* of the actuator 25.

16 Claims, 4 Drawing Sheets

DEVICE FOR POSITIONING, HOLDING OR GRIPPING

This application corresponds to French application 98.08120 of Jun. 26, 1998, the disclosure of which is incorporated herein by reference.

BACKGROUND OF THE INVENTION

The invention relates to a device for positioning, holding or gripping, particularly vehicle body parts, of the type comprising a housing containing a moveable equipment displaceable in translation, one end of the moveable equipment being connected to an actuating means and the other end of the moveable equipment being connected to or forming a positioning, gripping or holding member.

DESCRIPTION OF RELATED ART

The actuating means of the moveable equipment can be pneumatic jacks, hydraulic jacks, electric jacks, or any other suitable connection means adapted to transmit actuating force.

A first type of device used particularly for positioning is known by those skilled in the art as a "pilot carrier".

A second type of de-vice is known to those in the art as a "jointed gripper".

A third type of device is known to those in the art as a "gripper with shaped ramp".

In the second and third types of device, the blocking of a holding or gripping arm is generally obtained in a position in which the gripping arm is substantially perpendicular to the axis of force transmission of the actuating means.

All these devices are preferably used in automotive construction, to hold pieces of vehicle body work or sheet metal in the course of various operations of the type of stamping, welding, or any other shaping or intermetallic connection work by machines, assembly or welding robots.

In this application, there is also known the use of housings or modules comprising at least one detector of the position of the moveable equipment or a rod of the actuating means, so as to detect the condition of the device.

Generally speaking, as described for example in German utility model 9215151, the housing of the device is machined to open up an elongated slot permitting disposing adjustable detectors to determine or regulate the position of the member for positioning, gripping or holding in contact with the body work parts.

However, the presence of this elongated slot has the drawback of weakening the body or housing of the device, or alternatively of requiring reinforcement or increasing the thickness of this body or housing.

SUMMARY OF THE INVENTION

The invention has for its object to overcome the above drawbacks, by providing a new device offering high precision of adjustment in positioning, gripping or holding, and freeing the body work parts, by avoiding machining an elongated slot which weakens the device or increases its cost of production.

The invention has for its object a positioning, holding or gripping device, particularly for parts of body work, of the type comprising a housing containing a moveable equipment displaceable in translation, one end of the moveable equipment being connected to an actuating means and the other end of the moveable equipment being connected to or forming a positioning, holding or gripping member, characterized in that the housing has two separate spaced openings, adapted each to receive a detector of the position of the moveable equipment or a rod of the actuating means.

According to other characteristics of the invention:

the device comprises a detection module with two position detectors each inserted within one said housing opening;

the openings are disposed on the side of the rear securement shelf of the device;

the openings are disposed on the side of the lateral securement shelf of the device;

the openings are disposed at an angle on bevels provided between one lateral securement shelf and the rear securement shelf;

the position detectors are mounted on a rigid plate;

the rigid plate carries an electronic bloc;

at least one plate or small plate carrying at least one detector is mounted on the housing with a securement screw;

the rigid plate is pierced with a passage of the securement screw on a support;

the detection module has a dumbbell shape with two blocs connected by an intermediate portion.

BRIEF DESCRIPTION OF THE DRAWINGS

The invention will be better understood from the description which follows, given by way of non-limiting example, with reference to the accompanying drawings, in which.

DESCRIPTION OF THE PREFERRED EMBODIMENTS

Figure 1:
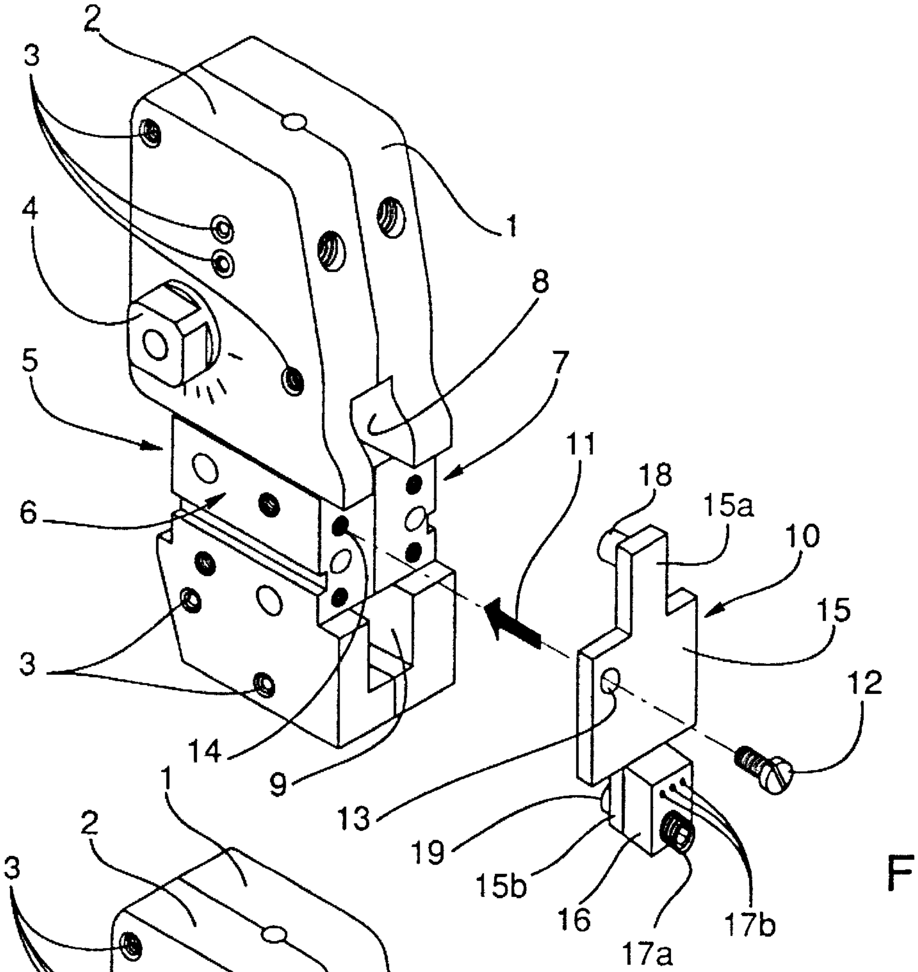
FIG. 1 is a schematic perspective view of a first embodiment of the device according to the invention.

In FIG. 1, a housing of the device according to the invention comprises two half-housings 1, 2 assembled to each other by means of a screw 3. The assembled housing contains a movable internal equipment prolonged at one end 4 in the shape of a square adapted to receive a gripping arm (not shown). The housing has a front securement surface 5, two lateral surfaces 6 for securement and a rear surface 7 for securement to a support (not shown) . On opposite sides of the rear securement shelf 7, are provided two openings 8 and 9 separate and spaced from each other. A detection module 10 is adapted to be assembled to the housing by displacement in the direction of the arrow 11 and screwing of a screw 12 passing through an opening 13 of the module with tapping 14 of the rear securement shelf. The module 10 has substantially the shape of a metallic plate 15 with two ends 15*a*, 15*b* carrying an electronic block 16 with a connector 17*a* and if desired electroluminescent display diodes 17*b*.

On the opposite side from the electronic block 16, the plate 15 has a first position detector 18 and a second position detector 19. The position detector 18 preferably detects the position of the moveable equipment when the desired gripping, holding or positioning has been obtained, whilst the detector 19 detects the withdrawal of the rod of the actuating means in case of freeing the positioned, held or gripped member.

The detectors 18 and 19 are shaped to engage in the openings 8 and 9 to come into proximity with targets, flags or elements whose position it detects, these elements, targets or flags being secured to the moveable equipment or to the rod of the actuating means.

In FIG. 1, the detection module prevents the use of the rear securement shelf 7, because of closing the tapped holes other than the tapped hole 14 provided on this rear securement shelf.

Figure 2:
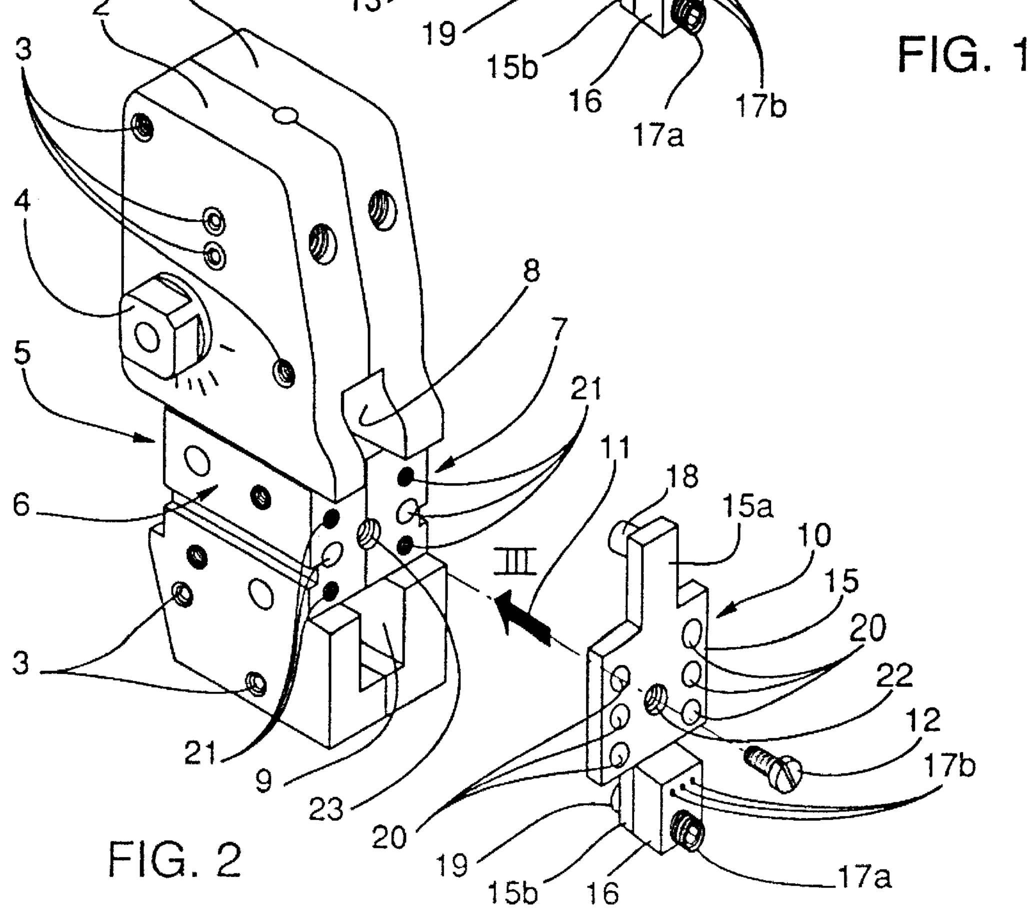
FIG. 2 is a schematic perspective view of a second embodiment of the invention.

Referring to FIG. 2, identical or functional equivalent elements to those in FIG. 1 have identical reference numerals to those of FIG. 1.

The difference between this second embodiment and the embodiment of FIG. 1 consists in a different configuration for the metallic plate 15 of the detection module 10: thus, this metallic plate 15 comprises six openings 20 facing tappings or openings 21 of the rear securement shelf 7.

Thanks to this arrangement, it is possible to mount the housing with the help of the rear securement shelf 7 on a support (not shown) by positioning the corresponding securement screws through the openings 20 of the plate 15: thus, this plate is trapped between the support (not shown) and the rear securement shelf 7.

In the case in which securement is not effected from the rear, the detection module could preferably be secured to the housing by the aid of the screw 12 inserted through the passage 22 and screwing into the tapping 23 of the housing.

In this second embodiment, it is according possible to use rear securement of the housing, this requiring however trapping the plate 15 of the detection module 10 between the rear shelf 7 and the support (not shown).

Figure 3:
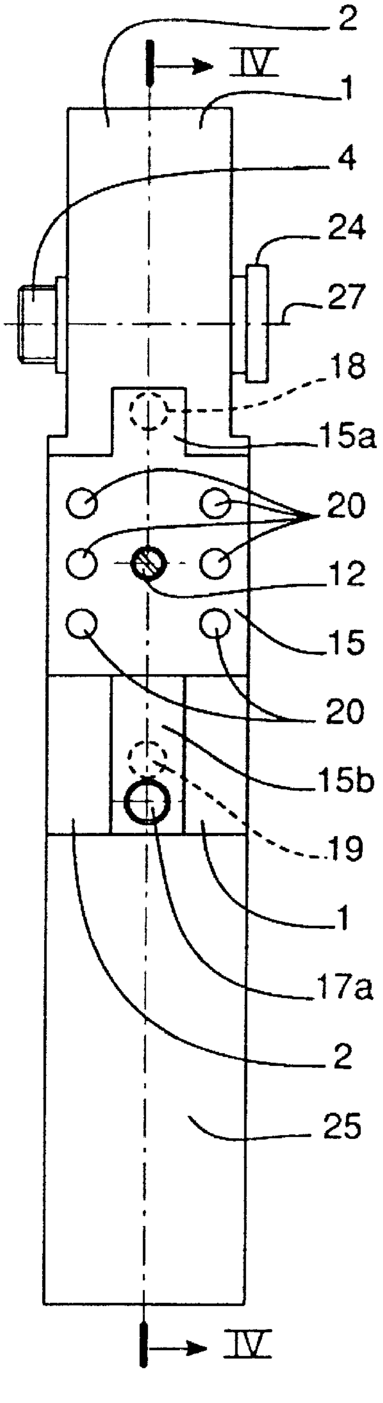
FIG. 3 is a schematic rear view in the direction of the arrow III of FIG. 2, of a device according to the invention.
Figure 4:
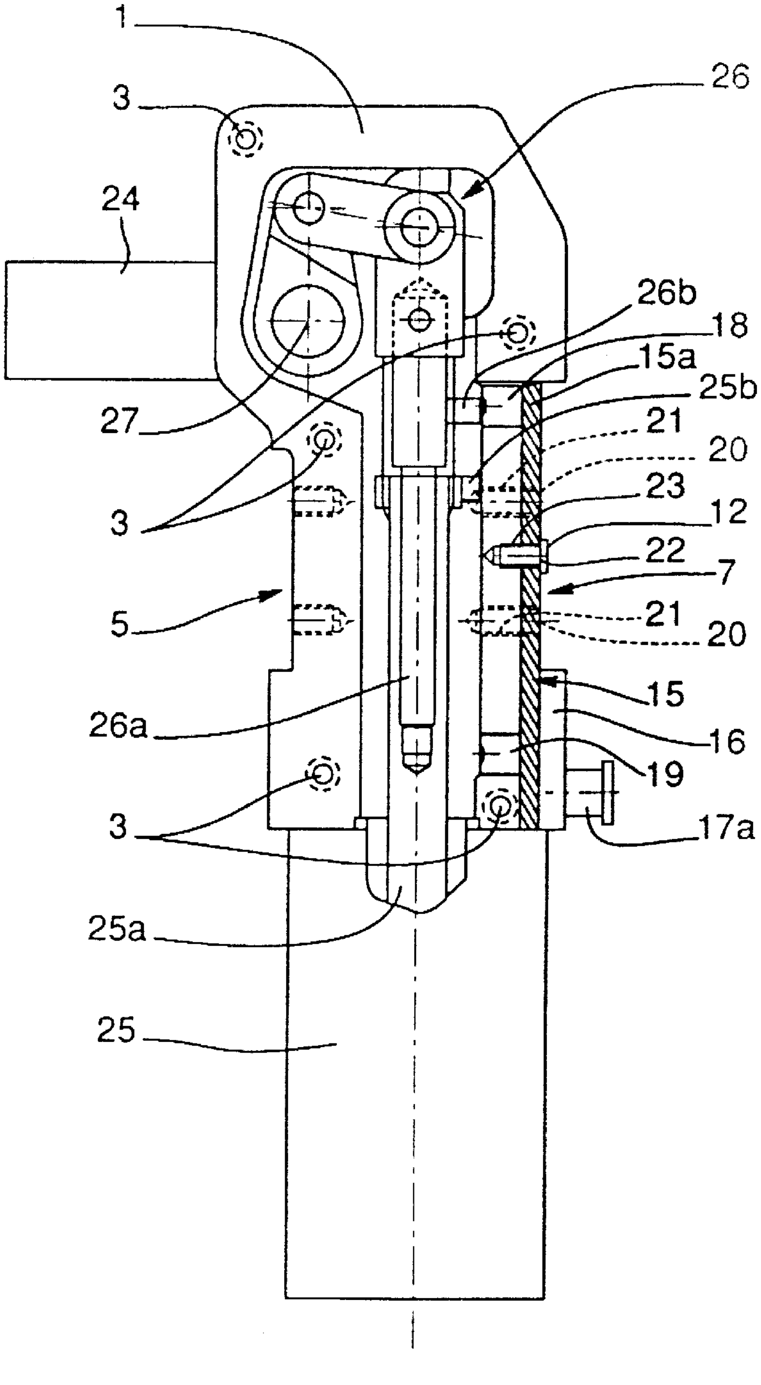
FIG. 4 is a schematic side view partially broken away on a median longitudinal plane, of the device of FIG. 2.

In FIGS. 3 and 4, identical or functionally equivalent elements to those of FIG. 2 are shown with reference numerals identical to those of FIG. 2.

The device comprises a gripping or holding arm 24 and an actuating means 25 disposed at the ends of a moveable equipment 26. The jack 25 comprises a rod 25*a* in which is screwed a screw-threaded rod 26*a* forming a portion of the moveable equipment 26 comprising several articulated levers translating the movement of translation of the rod 25*a* of the jack 25 into a movement of rotation of the gripping arm 24 about the axis 27.

The screw-threaded rod 26*a* is prolonged by a sleeve carrying a target, element or flag 26*b*, whilst the rod 25*a* carries a target or flag 25*b*. The gripping position of the arm 24 is obtained when the target 26*b* is located facing the position detector 18, so as to supply a detection signal to the electronic block 16 to be transmitted by means of the connector 17*a* to a control or surveillance means, of the automatically programmable type or the like. Similarly, the target 25*b* is detected by the detector 19 when the arm 24 is located in open position or in the liberation position (not shown), so as to transmit an opening signal to the electronic block 16 and to transmit this signal via the connector 17*a* or a cable directly connected to the electronic block 16, to a measurement exchange or to a programmable computer (not shown).

Figure 5:
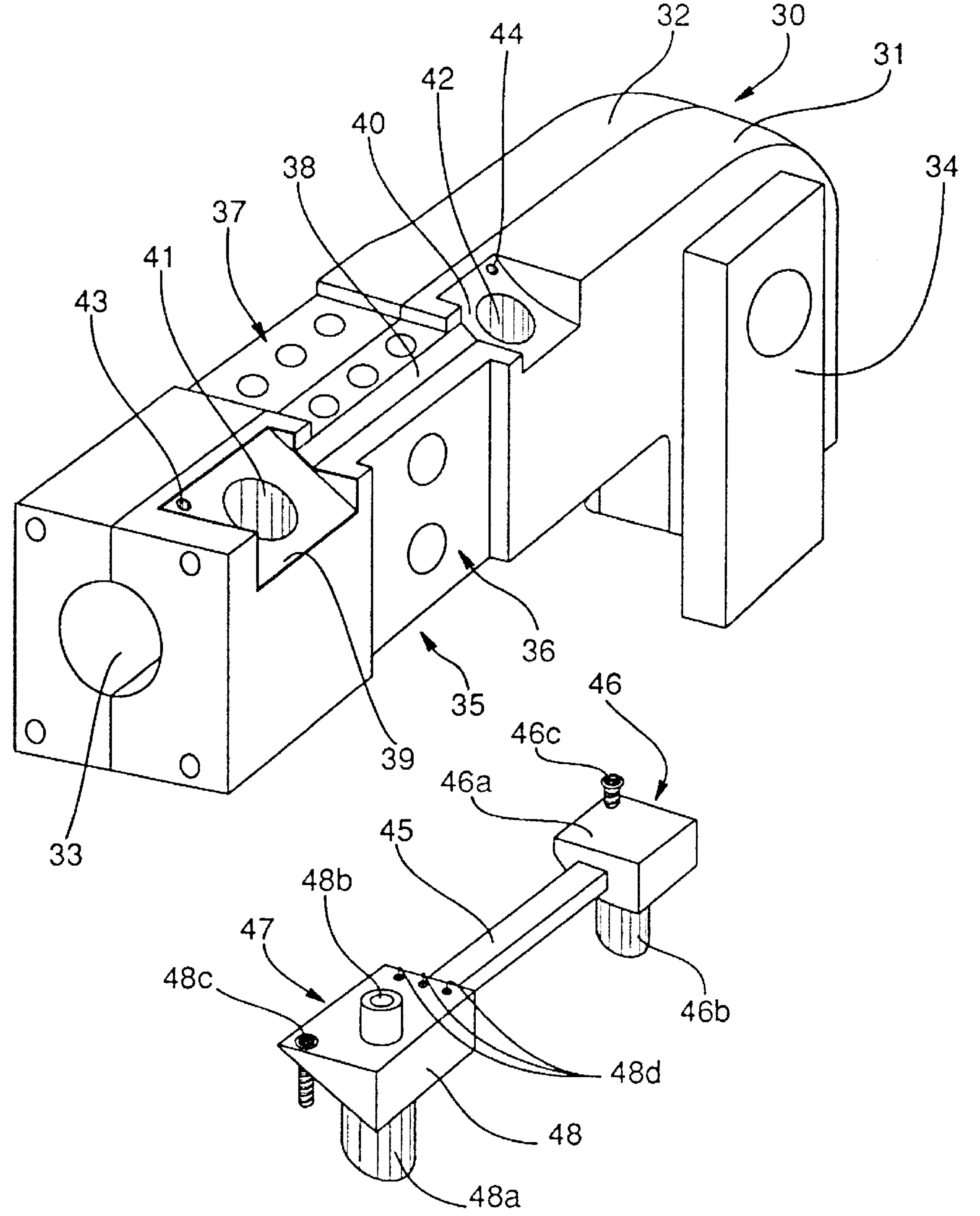
FIG. 5 is a schematic perspective view of a third embodiment of the invention.

Referring to FIG. 5, a third housing 30 of the device according to the invention is assembled from two half-housings 31, 32. The housing 30 comprises a lower opening 33 for the passage of a rod of actuating means (not shown) and a gripping arm 34 mounted on a rotatable shaft driven by an internal moveable equipment.

The housing also comprises a front securement face 35, two side securement faces 36 and a rear securement face 37. Within the angle between a side face 36 and the rear face 37 is provided an intermediate channel 38 between two bevels 39 and 40 in which are provided respectively openings 41 and 42 as well as tappings 43 and 44. A detection module having a dumbbell shape with an intermediate portion 45 adapted to be applied to the channel 38 and two blocks 46, 47 adapted to be fixed respectively to the places of the bevels 40 and 39, is associated with the housing, so as to permit the positional detector of the moveable equipment or of the rod of the actuating means.

To this end, the block 46 comprises a small plate 46*a* bearing a proximity detector 46*b* and a securement screw 46*c* adapted to co-act with the bore 44, whilst the block 47 comprises bevel plate 48 with on its lower surface a proximity detector 48*a* and on its upper surface a connector 48*b*, a securement screw 48*c* adapted to be screwed in the tapping 43 and three electroluminescent diodes 48*d* indicating the condition of the device.

The third embodiment is advantageous in that it permits securement of the device to a support (not shown) with the help of any kind of securement shelf without trapping the detection module. It is thus possible to replace the detection module without dismounting the device from its support.

Although it is possible to protect the detection module by a sheet (not shown), sufficient rigidity could be obtained by overmolding the intermediate connection part 45 containing the transmission cable between the detector 46*b* and the electronic block 48, by means of a rigid synthetic material which is shock-resistant.

According to a modification (not shown), there is used as the intermediate part 45 a flexible cable connecting the detectors 46*b* and 48*a*: this arrangement permits using the same detection module for devices of different paths.

Figure 6:
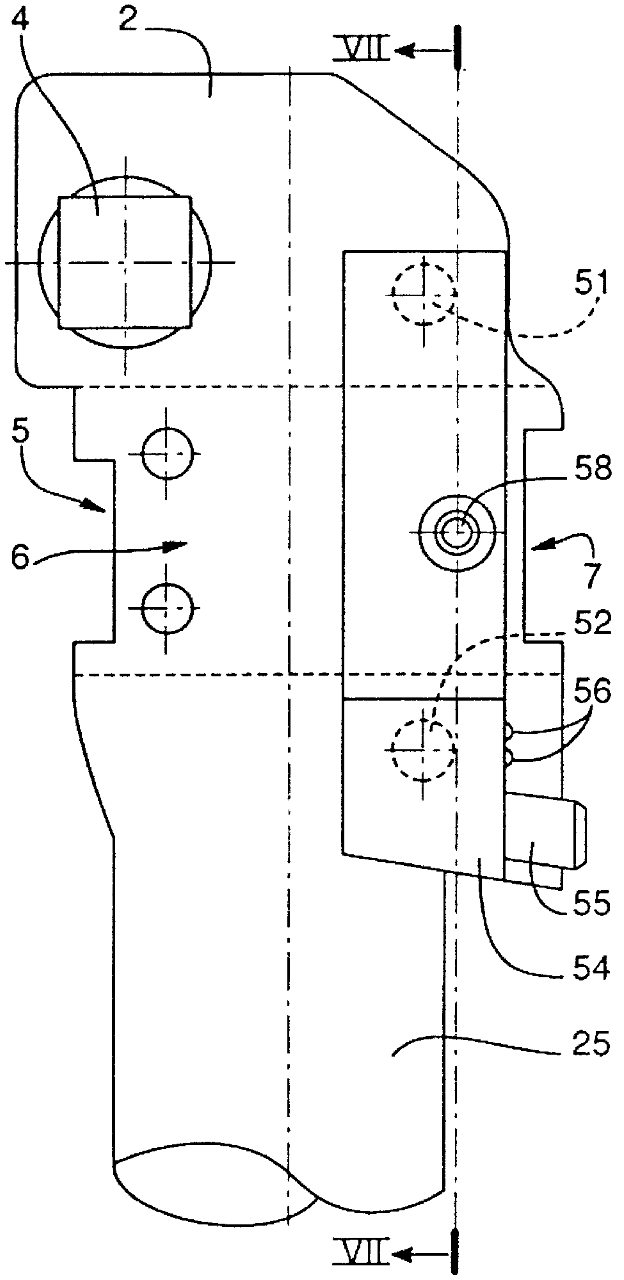
FIG. 6 is a schematic side elevational view of a fourth embodiment of the invention.
Figure 7:
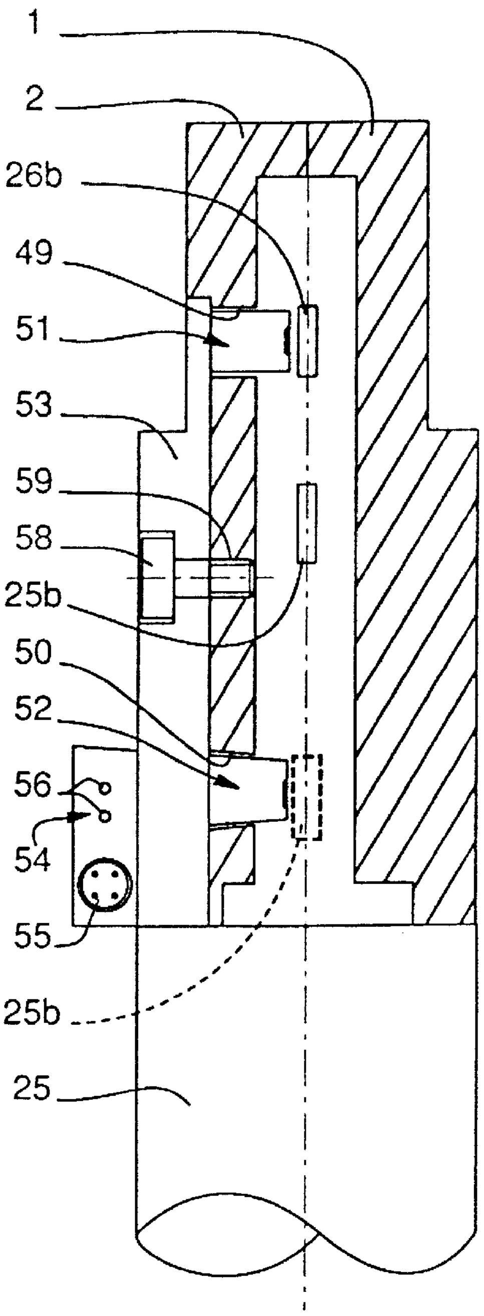
FIG. 7 is a schematic cross-sectional view on the line VII—VII of FIG. 6.

Referring to FIGS. 6 and 7, a fourth embodiment of the invention comprises elements that are identical or functionally equivalent to those of FIGS. 1 to 4, shown with the same reference numerals as those of FIGS. 1 to 4.

In this fourth embodiment, two bores 49 and 50 are provided in a half-housing 2 on the side of a lateral securement shelf 6. The bores 49 and 50 receive proximity detectors 51 and 52 mounted on a plate 53 carrying a block 54 with a connector 55 and two electroluminescent diodes 56 for condition indication.

The elements 51 to 56 mentioned above form a detection module fixed with the help of a screw 58 screwed into a tapping 59 provided in the half-housing 2. Thus, upon movement of the targets or flags 25*b* or 26*b*, the detector 51 detects the position of the element 26*b* in the closed or gripping position, whilst the detector 52 detects the position shown in broken lines of the detector 25*b* in the open or liberating position.

The invention described with reference to several embodiments is in no way thereby limited but on the contrary covers all modifications of shape and of embodiment within the spirit and scope of the invention.

What is claimed is:

1. In a positioning device comprising:

a housing (1–2, 31–32) containing a moveable equipment (26) displaceable in translation;

a first end (26*a*) of the moveable equipment (26) connected to an actuating means (25); and a second end (4, 27) of the moveable equipment (26) connected to a positioning (24, 34);

the improvement wherein the housing (1–2, 31–32) has two openings (8, 9; 41, 42; 49, 50) that are separate and spaced, the two openings being adapted to receive a detector (18, 19, 46*b*, 48*a*, 51, 52) for detecting the position of the moveable equipment (26) and a withdrawal of a rod (25*a*) of the actuating means (25).

2. Device according to claim 1, wherein the device further comprises a detection module (10, 45–48) with two position detectors (18, 19, 46*b*, 48*a*, 51, 52) each inserted within one said opening (8, 9; 41, 42; 49, 50) of the housing.

3. Device according to claim 2, wherein the detection module has a dumbbell shape with two blocks (46, 47) connected by an intermediate portion (45).

4. Device according to claim 1, wherein the device further comprises a rear securement shelf with a side and the openings (8, 9) are disposed on the side of the rear securement shelf (7) of the device.

5. Device according to claim 1, wherein the device further comprises a lateral securement shelf with a side and the openings (49, 50) are disposed on the side of the lateral securement shelf (6) of the device.

6. Device according to claim 1, the device further comprising:

a lateral securement shelf and a rear securement shelf on adjacent faces of the device; and spaced bevels located between the lateral securement shelf and the rear securement shelf, wherein the openings (41, 42) are disposed at an angle on the spaced bevels (39, 40) provided between the lateral securement shelf (6) and the rear securement shelf (7).

7. Device according to claim 1, wherein the position detectors (18, 19; 51, 52) are mounted on a rigid plate (15, 53).

8. Device according to claim 7, wherein the rigid plate (15, 53) carries an electronic block (16, 54).

9. Device according to claim 7, wherein the rigid plate (15) is pierced (20) for the passage of a screw for securement on a support.

10. Device according to claim 1, wherein at least one plate (15, 46*a*, 53) carrying at least one detector is mounted on the housing (1–2; 31–32) with the help of a securement screw (12, 58).

11. A positioning device comprising:

a moveable equipment displaceable in translation and contained by a housing;

a first end of the moveable equipment connected to an actuator having a rod;

a second end of the moveable equipment connected to a positioning member;

two openings in the housing; and a detection module operatively mounted in alignment with the two openings to detect a position of the moveable equipment in a first of the two openings and to detect a withdrawal of the rod of the actuator in a second of the two openings.

12. The device of claim 11, wherein the detection module comprises two position detectors, each of the two position detectors inserted within one of the two openings.

13. The device of claim 11, further comprising:

a first face; and a rear securement shelf set into the first face, the rear securement shelf having a side generally parallel with the first face, wherein the two openings are disposed on the side of the rear securement shelf.

14. The device of claim 11, further comprising:

a first face along a first, narrow dimension of the device;

a second face along a second, wide dimension of the device; and a lateral securement shelf set into the second face, the lateral securement shelf having a side generally parallel with the second face, wherein the two openings are disposed on the side of the lateral securement shelf.

15. The device of claim 11, further comprising:

a first face along a first, narrow dimension of the device;

a rear securement shelf set into the first face;

a second face along a second, wide dimension of the device;

a lateral securement shelf set into the second face; and two spaced apart bevels located between the lateral securement shelf and the rear securement shelf, wherein the one of the two openings is disposed on each of the two bevels.

16. The device of claim 11, wherein the detection module comprises two detectors mounted on a rigid plate.

* * * * *